United States Patent [19]

Itano et al.

[11] Patent Number: 4,951,386
[45] Date of Patent: Aug. 28, 1990

[54] APPARATUS FOR DISASSEMBLING BEARING CAPS AND ASSEMBLING METALS

[75] Inventors: Katashi Itano, Okayama; Toshikazu Shirai, Kure; Yoshitomo Ishikawa, Higashihiroshima; Yoji Nakao, Hiroshima, all of Japan

[73] Assignee: Mazda Motor Corporation, Hiroshima, Japan

[21] Appl. No.: 403,929

[22] Filed: Sep. 7, 1989

[30] Foreign Application Priority Data

Sep. 8, 1988 [JP] Japan .................. 63-225359

[51] Int. Cl.⁵ .......................... B23P 21/00
[52] U.S. Cl. ........................ 29/783; 29/787; 29/795; 29/824
[58] Field of Search ............. 29/156.4 R, 430, 469, 29/426.1, 426.3, 426.5, 771, 783, 787, 791, 795, 822, 823, 824

[56] References Cited

U.S. PATENT DOCUMENTS

| | | | |
|---|---|---|---|
| 2,983,999 | 5/1961 | Sharpe | 29/712 X |
| 3,058,150 | 10/1962 | Makowski | 29/771 X |
| 4,057,889 | 11/1977 | Ferguson | 29/426.5 |
| 4,850,102 | 7/1989 | Hironaka et al. | 29/799 X |
| 4,872,257 | 10/1989 | Wakamori et al. | 29/703 X |
| 4,884,330 | 12/1989 | Sticht | 29/430 |

FOREIGN PATENT DOCUMENTS 52-24311  6/1977  Japan .
62-130137 6/1987  Japan .
62-157741 7/1987  Japan .

OTHER PUBLICATIONS

Page 12 M 653, Identifying Japanese Applications 62-157741 (A) and 62-130137 (A) as Highlighted and English Purpose and Constitution Thereof.

Primary Examiner—Timothy V. Eley
Assistant Examiner—Frances Chin
Attorney, Agent, or Firm—Staas & Halsey

[57] ABSTRACT

An apparatus according to the present invention disassembles bearing caps from a cylinder block and assembles upper metals to the cylinder block and lower metals to the bearing caps. The apparatus is provided with a movable base which is reciprocally moved between a position above a lower metal assembling station and a position above a conveyor lines. A bearing cap disassembling mechanism and upper metal holding mechanism are commonly attached to the movable base. The bearing cap disassembling mechanism disassembles the bearing caps tentatively assembled to the cylinder block and the upper metal holding mechanism holds and assembles a plurality of upper metals to the cylinder block. A moving mechanism is connected to the movable base to move the movable base so that a disassembling operation of the bearing caps from the cylinder block, an assembling operation of the upper metals to the cylinder block, and an assembling operation of the lower metals to the bearing caps are performed within one reciprocal movement of the movable base.

20 Claims, 9 Drawing Sheets

APPARATUS FOR DISASSEMBLING BEARING CAPS AND ASSEMBLING METALS

BACKGROUND OF THE INVENTION

The present invention relates to an apparatus for disassembling bearing caps and assembling metals, which can parallelly perform disassembly of bearing caps which are tentatively or temporarily assembled to a cylinder block and assembly of metals to the disassembled bearing caps and the cylinder block.

In an engine assembly line, journal bearing portions are machined while bearing caps are tentatively assembled to a cylinder block. The bearing caps are then disassembled (removed) from the cylinder block. Upper metals are assembled to the cylinder block from which the bearing caps are removed. Lower metals are assembled to the corresponding bearing caps. A crankshaft and a thrust metal are assembled to the cylinder block in turn. The bearing caps are then assembled to the cylinder block, thus completing an engine.

Each bearing cap is fitted under pressure in the cylinder block and is fastened by a bolt. For this reason, it is cumbersome to disassemble the bearing caps from the cylinder block, and it is very difficult to automate the overall disassembling operations.

An apparatus which can automatically perform the disassembling operations of the bearing caps after removal of bolts is described in, e.g., Japanese Utility Model Publication No. 52-24311. The apparatus described in this prior art utility model comprises a pair of upper and lower sliders provided to a machine frame, a plurality of swing members which are attached to one slider and can be engaged with bearing caps from the above, and a plurality of support members which are attached to the other slider and have wedge-shaped pawl portions. One slider is moved while the swing members are engaged with the bearing caps from the above, so that the bearing caps are inclined through the swing members to form gaps between the bearing caps and a cylinder block. The other slider is moved to insert the pawl portions of the support members into the gaps. Thereafter, the bearing caps are moved toward the support members through the one slider and the swing members to be transferred onto the pawl portions, thus removing the bearing caps.

After the bearing caps are disassembled, upper metals must be assembled to journal bearing portions of the cylinder block, and lower metals must be assembled to the bearing caps which are disassembled and held at a separate location. It is relatively difficult to automatically handle and assemble these metals, and these operations have not been so automated until very recently. In recent years, however, a metal assembling apparatus described in, e.g., Japanese Patent Laid-Open (Kokai) No. 62-157741 is known. This prior art patent describes a mechanism for positioning a pair of upper and lower metals while switching them into a downwardly projecting posture and an upwardly projecting posture, a mechanism for causing a swingable suction head to draw each metal by suction and assembling it to a large end portion of a connecting rod and the cylinder block, and the like.

However, the apparatus disclosed in Japanese Utility Model Publication No. 52-24311 is not arranged integrally with a bolt disassembling means such as a nut runner. For this reason, in this prior art, before removal of the bearing caps by this apparatus, bolt disassembling operations must be performed in advance by the bolt disassembling means. As a result, the number of steps is increased, and a cycle time is prolonged. Furthermore, in the conventional apparatus, since the bearing cap disassembling apparatus and the metal handling apparatus are arranged not integrally with each other but independently, the entire system cannot be integrated, and the number of steps is unnecessarily increased, resulting in a long cycle time.

SUMMARY OF THE INVENTION

The present invention has been made in consideration of the above problems, and has as its object to provide an apparatus for disassembling bearing caps and assembling metals, which can efficiently work within a short cycle time while a disassembling operation of bearing caps from a cylinder block is rationally, integrally related to an assembling operation of upper and lower metals.

It is another object of the present invention to provide an apparatus for disassembling bearing caps and assembling metals, which can decrease the number of steps and can shorten a cycle time.

It is still another object of the present invention to provide an apparatus for disassembling bearing caps and assembling metals, which can eliminate losses in movement and can improve work efficiency.

To attain the above-mentioned object, according to one aspect of the present invention, there is provided an apparatus for disassembling bearing caps from a cylinder block and assembling upper metals to the cylinder block and lower metals to the bearing caps, which apparatus comprising: a conveyor line on which a cylinder block to which the bearing caps are tentatively assembled is conveyed in an up-side down state; a disassembling/assembling station, arranged on the conveyor line, for disassembling the bearing caps from the cylinder block and assembling the upper metals to the cylinder block; a lower metal assembling station having lower metal assembling means, arranged beside the disassembling/assembling station, for assembling the lower metals to the bearing caps disassembled at the disassembling/assembling station; a metal feed station for feeding the upper and lower metals; a movable base which is reciprocally moved between a position above the lower metal assembling station and a position above the conveyor line; bearing cap disassembling means and upper metal holding means, commonly attached to the movable base, the bearing cap disassembling means disassembling the bearing caps tentatively assembled to the cylinder block and the upper metal holding means holding and assembling a plurality of upper metals to the cylinder block; and moving means, connected to the movable base, for moving the movable base so that a disassembling operation of the bearing caps from the cylinder block, an assembling operation of the upper metals to the cylinder block, and an assembling operation of the lower metals to the bearing caps are performed within one reciprocal movement of the movable base.

In the apparatus for disassembling bearing caps and assembling metals according to the present invention, bearing cap disassembling means and metal holding means are attached to a common movable base. The movable base is reciprocally moved between a position above a conveyor line on which a cylinder block with bearing caps is conveyed and a position above a lower metal assembling station and a metal feed station. In an immediately preceding cycle, the metal holding means holds upper metals. In this state, when the cylinder block is conveyed to a disassembling/assembling station, a plurality of bearing caps are simultaneously removed by the bearing cap disassembling means. Thereafter, the movable base is slightly moved, and the metal holding means assembles a plurality of upper metals to the cylinder block. The movable base is moved to a position above the lower metal assembling station and an upper metal feed station, and a plurality of bearing caps are transferred to the lower metal assembling station, thus assembling the lower metals to these bearing caps. Parallel to assembly of the lower metals, the metal holding means holds a plurality of new upper metals at the metal feed station. In this manner, the movable base is returned to the position above the conveyor line, thus completing a series of operations.

In this manner, disassembly of bearing caps and assembly of upper and lower metals can be achieved during a reciprocal movement of the movable base.

Note that the upper and lower metals are respectively fed by a separate loader to a table on which upper metals to be fed to the metal holding means are temporarily placed and to a lower metal assembling means.

In this manner, the positional relationship between the bearing cap disassembling means and the metal holding means corresponding to a cylinder block on the conveyor line is set to correspond to the positional relationship between the lower metal assembling station and the upper metal feed station. Therefore, a series of operations for disassembling bearing caps and assembling metals can be efficiently performed with a small number of steps, i.e., within a short cycle time without any losses in the movement of the apparatus during a reciprocal movement of the movable base.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENT

An arrangement of an apparatus for disassembling bearing caps and assembling metals according to an embodiment of the present invention will be described in detail below with reference to the accompanying drawings.

In this embodiment, the present invention is applied to an apparatus for disassembling bearing caps C and assembling metals, which performs disassembly of five bearing caps C from a cylinder block B of an in-line 4-cylinder engine, assembly of lower metals m1 to the bearing caps C disassembled from the cylinder block B, and assembly of upper metals m2 to the cylinder block from which the bearing caps are removed.

Figure 1:
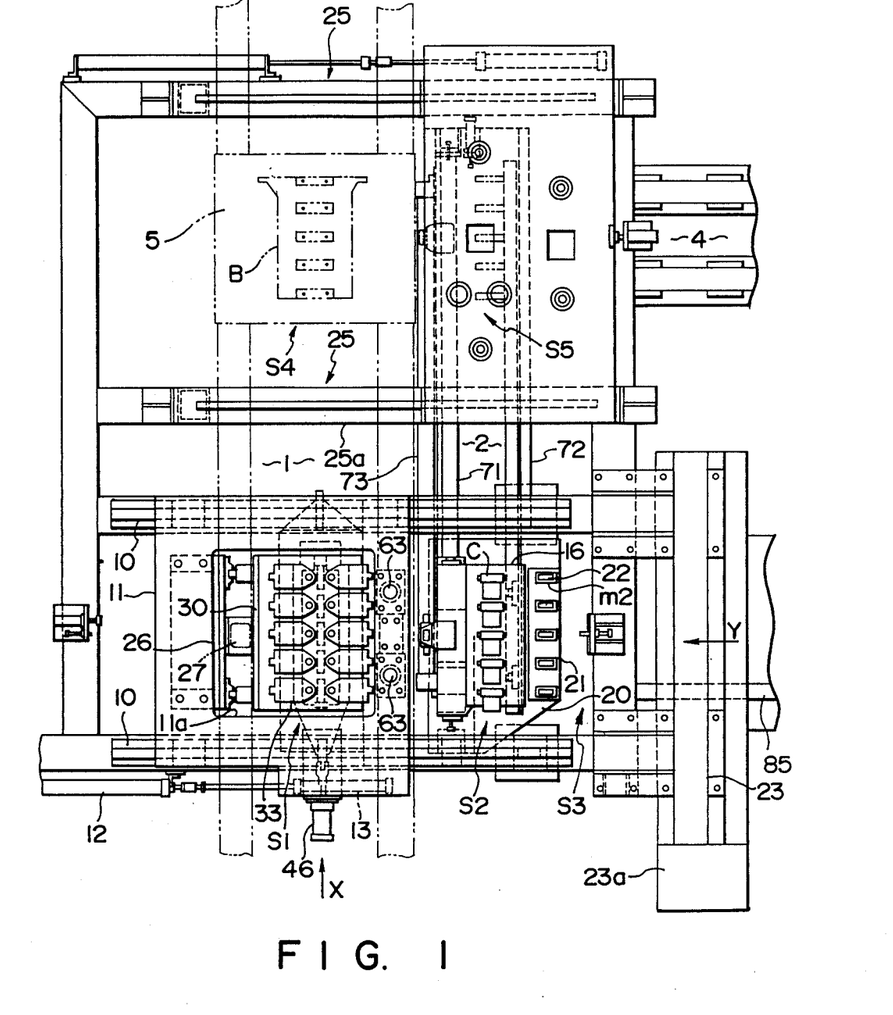
FIG. 1 is a plan view showing an arrangement of an apparatus for disassembling bearing caps and assembling metals according to the present invention.
Figure 2:
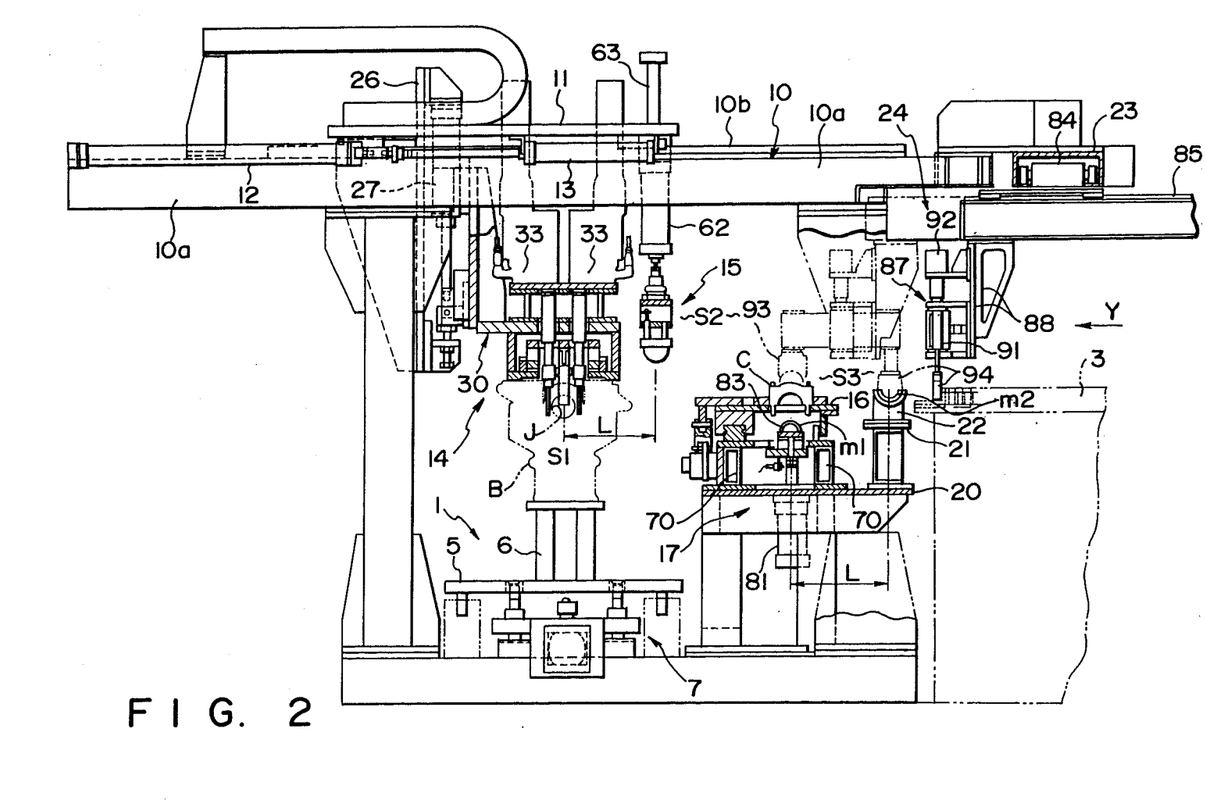
FIG. 2 is a front view of the apparatus shown in FIG. 1.

As shown in FIGS. 1 and 2, a conveyor line 1 is arranged to convey a cylinder block B for assembly in an up-side down state from the front side to the rear side, as indicated by an arrow X in FIG. 1. A bearing cap disassembling station S1 for performing a disassembling operation of the bearing caps C from the cylinder block B and an assembling operation of the upper metals m2 to the cylinder block B from which the bearing caps C are removed is arranged at the front portion of the conveyor line 1. A lower metal assembling station S2 for assembling the lower metals m1 to the bearing caps C removed from the cylinder block B is arranged at the right side of the bearing cap disassembling station S1. A metal feed station S3 for feeding upper and lower metals m2 and m1 from a right metal conveyor line 3 in a direction of an arrow Y is arranged at the right side of the lower metal assembling station S2.

A shaft assembling station S4 for assembling a crankshaft (not shown) to the cylinder block B is arranged at a portion of the conveyor line 1 behind the bearing cap disassembling station S1. A shaft feed station S5 is arranged behind the lower metal assembling station S2 and at the right side of the shaft assembling station S4. Crankshafts are fed from a right crankshaft conveyor line 4 to the shaft shaft feed station S5.

The cylinder block B is placed and fixed on a pallet 5 via a jig 6. The pallet 5 is conveyed by a conveyor mechanism 7 along the conveyor line 1.

A pair of portal frames 10 are disposed to extend over the stations S1, S2, and S3 in a right-and-left direction. A movable base 11 is arranged on horizontal beams 10a constituting upper horizontal portions of both the portal frames 10. The movable base 11 is guided along rails 10b disposed on the horizontal beams 10a to be moved in the right-and-left direction. An opening 11a is formed at a substantially central portion of the movable base 11 except for the horizontal beams 10a.

A pair of transfer cylinders 12 and 13 are connected to the movable base 11. The movable base 11 is reciprocally moved by the cylinders 12 and 13 over the stations S1, S2, and S3. A bearing cap disassembling unit 14 for simultaneously disassembling five bearing caps C of the cylinder block B and an upper metal holding unit 15 for simultaneously assembling five upper metals m2 to five journal bearing portions J of the cylinder block B from which the bearing caps C are removed are parallelly mounted on the movable base 11 to project downward.

A bearing cap conveyor line 2 for conveying a pallet 16 for conveying the bearing caps is arranged to extend from the lower metal assembling station S2 to the shaft feed station S5 in a back-and-forth direction. The conveyor line 2 comprises a base frame 20 extending from the lower metal assembling station S2 to the shaft feed station S5. A lower metal assembling unit 17 for simultaneously assembling lower metals m1 to the five bearing caps C placed on the pallet 16 is disposed below the pallet 16 and on the base frame 20 located at the lower metal assembling station S2. A tentative placing table 21 having five trays 22 for tentatively placing upper metals m2 thereon is arranged on the base frame 20 on the right side of the lower metal assembling unit 17 to extend in the back-and-forth direction.

A girder 23 is disposed above a downstream portion (left portion in FIG. 1) of the metal conveyor line 3. The girder 23 has a rectangular section and extends at and is supported by the right end portions of the front and rear horizontal beams 10a. A metal feed unit 24 for receiving a pair of upper and lower metals m2 and m1 from the metal conveyor line 3 and feeding the lower metal m1 to the lower metal assembling unit 17 and the upper metal m2 to each tray 22 is arranged below the girder 23 to be movable in the right-and-left and back-and-forth directions.

A pair of front and rear portal frames 25 are disposed over the shaft assembling station S4 and the shaft feed station S5. A shaft assembling unit for assembling a crankshaft (not shown) to the cylinder block B is arranged over horizontal beams 25a constituting upper horizontal portions of these frames 25. Since the shaft assembling unit is not directly related to the present invention, it is not shown in the drawings, and its description will be omitted.

The structures of the bearing cap disassembling unit 14, the upper metal holding unit 15, the lower metal assembling unit 17, and the metal feed unit 24 will be described in detail below in turn.

Figure 3:
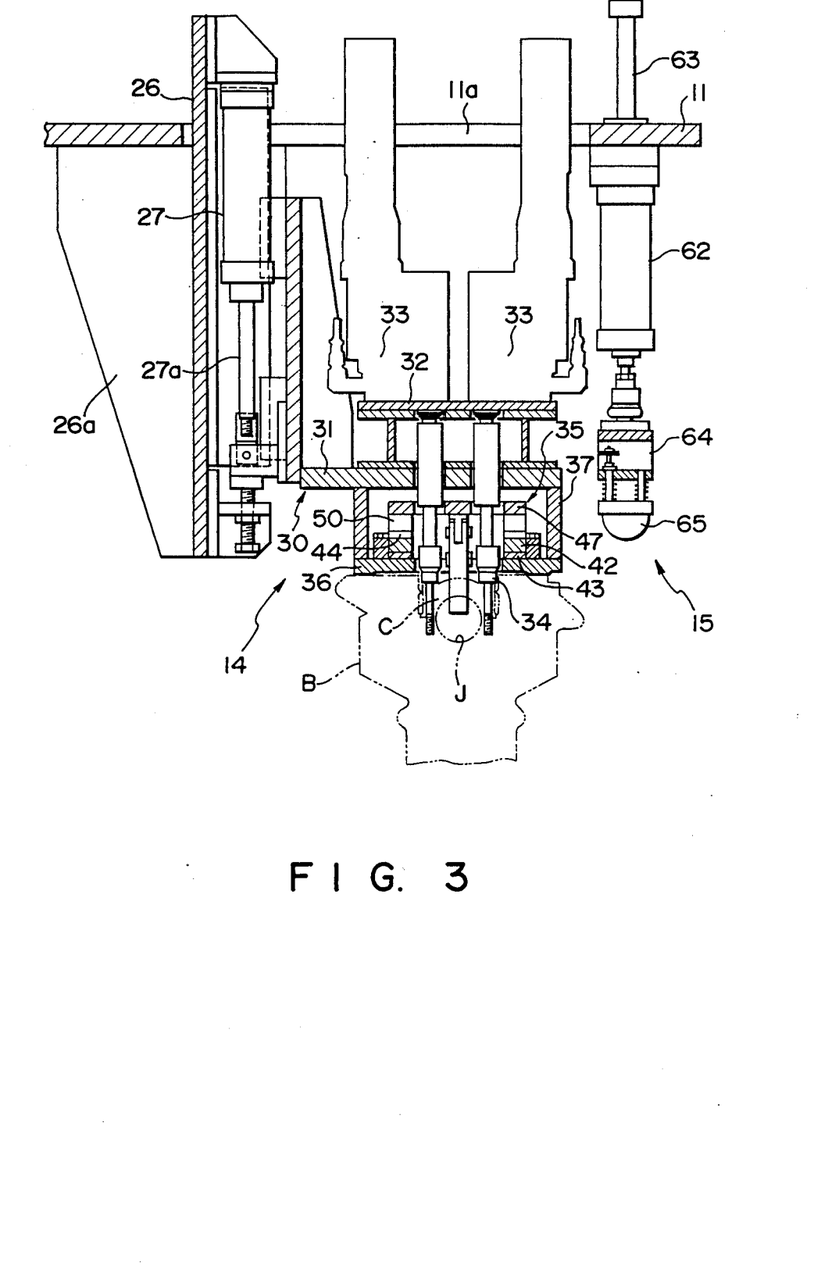
FIG. 3 is a front view showing in detail arrangements of a bearing cap disassembling unit and a metal holding unit.

(I) Bearing Cap Disassembling Unit 14 (FIGS. 1 to 7):

As shown in FIG. 1, the square, large opening 11a is formed at the central portion of the movable base 11. As shown in FIG. 3, a flat support and guide frame 26 extends downward through the left end portion of the opening 11a. The guide frame 26 is firmly fixed on the movable base 11 through a pair of front and rear brackets 26a. A support frame 30 which has an L-shaped section when viewed from the front side and is engaged with a guide portion 26b of the guide frame 26 to be movable in only the vertical direction is mounted at the right side of the guide frame 26. A lift cylinder 27 having a piston rod which is driven in the vertical direction is mounted on the right side surface of the guide frame 26. The support frame 30 is coupled to the lift cylinder 27, and is vertically moved upon operation of the lift cylinder 27.

A mounting table 32 is arranged above a support plate 31 constituting the horizontal portion of the support frame 30. Five pairs of, i.e., 10 nut runners 33 for simultaneously loosening five pairs of, i.e., 10 bolts attached to the bearing caps C is mounted on the mounting table 32 to extend downward. An output head 34 of each nut runner 33 projects downward through the mounting table 32 and the support plate 31.

A bearing cap removing mechanism 35 (to be described below) is arranged below the support plate 31.

Figure 4:
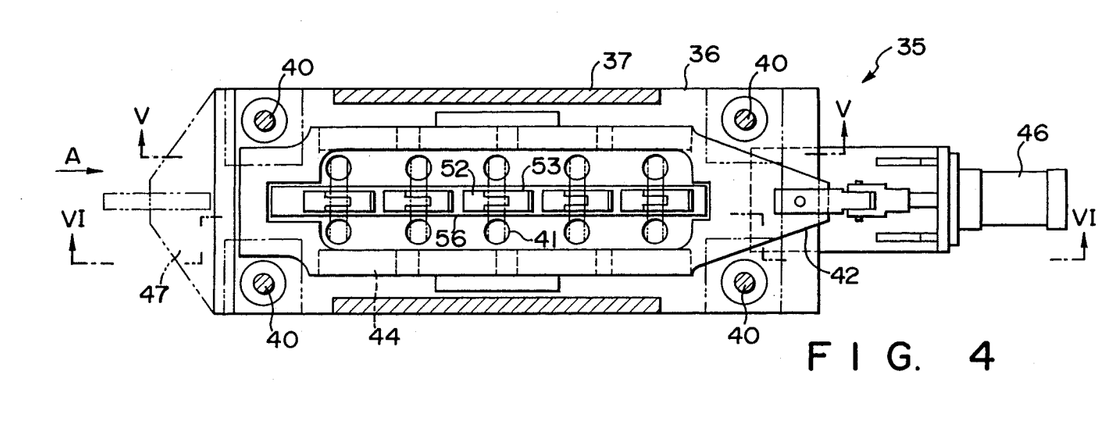
FIG. 4 is a plan view showing an arrangement of a bearing cap removing mechanism.

As shown in FIGS. 3 to 7, the bearing cap removing mechanism 35 comprises a base plate 36 below the support plate 31 to be separated by a predetermined interval therefrom. The support plate 31 and the base plate 36 are fixed to each other through a pair of right and left side plates 37 and guide columns 40 located at four corners, as best illustrated in FIG. 4. Insertion holes 41 which respectively receive the output heads 34 of the five pairs of, i.e., 10 nut runners 33 are formed in the support plate 31 and the base plate 36. A driving plate 42 is disposed on the upper surface of the base plate 36 to cover an outer peripheral portion of a region where the ten insertion holes 41 are formed.

Figure 5:
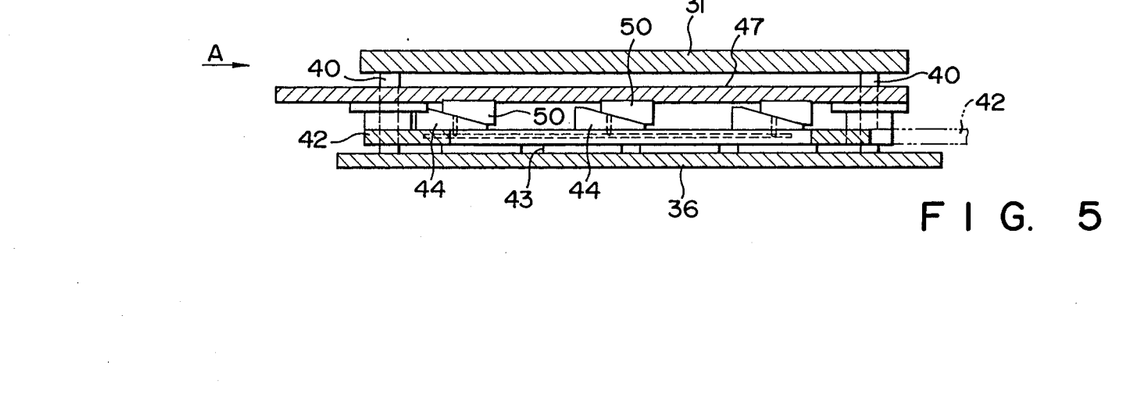
FIG. 5 is a longitudinal sectional view of the bearing cap removing mechanism taken along a line V—V in FIG. 4.
Figure 6:
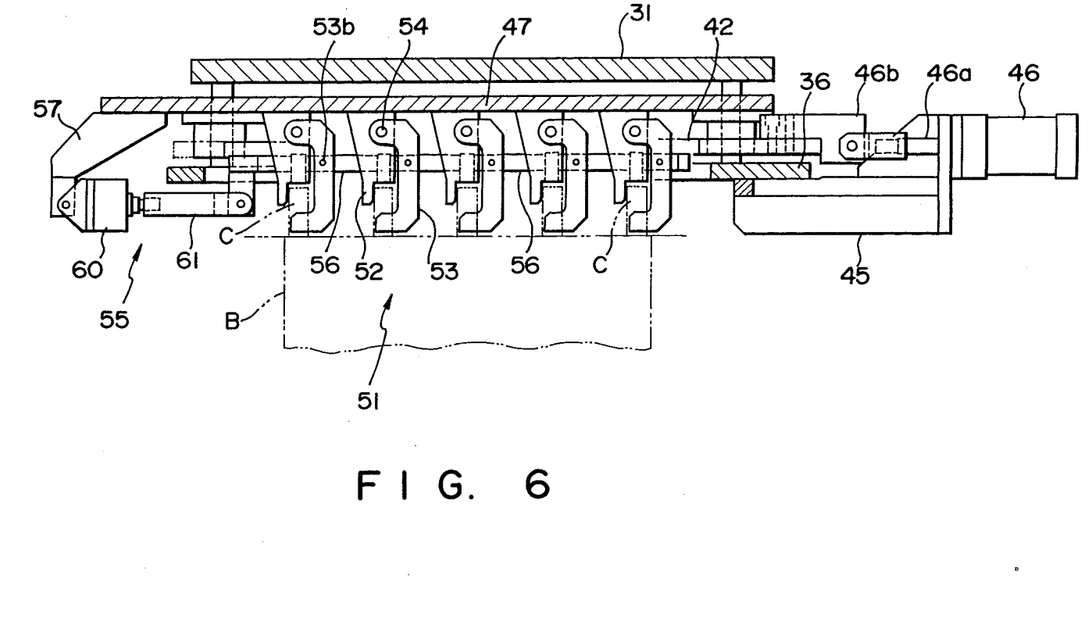
FIG. 6 is a longitudinal sectional view of the bearing cap removing mechanism taken along a line VI—VI in FIG. 4.

The driving plate 42 is supported to be slidable in the back-and-forth direction through a slide liner 43, as shown in FIG. 5. Three cam members 44 each having an inclined surface are fixed on the upper surfaces of the right and left side portions of the driving plate 42. The inclined surface of each cam member 44 is defined so that its upper surface is inclined downward toward the front side. As shown in FIGS. 4 and 6, a removing cylinder 46 is attached to the front end of the base plate 36 through a bracket 45. The driving plate 42 is coupled to the distal end of a rod 46a of the removing cylinder 46 through a coupling member 46b. The driving plate 42 is moved by a predetermined stroke by the removing cylinder 46 in the back-and-forth direction.

A driven plate 47 having ten insertion holes (not shown) corresponding to the insertion holes 41 is disposed between the driving plate 42 and the support plate 31, as shown in FIG. 5. The above-mentioned guide columns 40 are inserted through the four corners of the driven plate 47 to slidably guide the driven plate 47 in only the vertical direction. Three cam members 50 having inclined surfaces which are in complementarily sliding contact with the inclined surfaces of the cam members 44 described above are fixed to the lower surfaces of the right and left side portions of the driven plate 47. In this manner, when the driving plate 42 is moved forward by the cylinder 46, the driven plate 47 is displaced upward by a predetermined distance by a cam operation of the cam members 44 and 50; when the driving plate 42 is moved backward, the driven plate 47 is displaced downward by a predetermined distance.

As shown in FIG. 6, five gripping mechanisms 51 each comprising a bracket-like engaging member 52 and a swing arm 53 axially and pivotally supported near the upper end of the engaging member 52 by a right-and-left support shaft 54 are arranged at the central portion along the right-and-left direction of the driven plate 47. An opening/closing mechanism 55 for simultaneously opening/closing these five gripping mechanisms 51 is attached to the driven plate 47.

Figure 7:
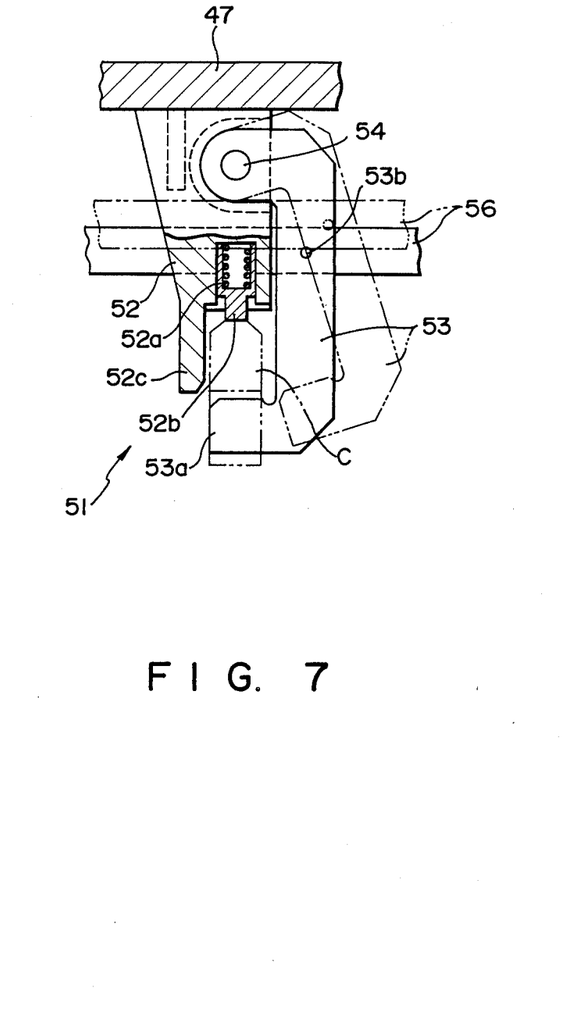
FIG. 7 is a side view showing an arrangement of a gripping mechanism shown in FIG. 6.

As shown in FIG. 7, the engaging member 52 of each gripping mechanism 51 comprises a receiving portion 52c for receiving the rear end of each bearing cap C at the front end of its lower end portion. A pressing member 52b biased downward by a spring 52a is mounted on the lower portion of the engaging portion 52 facing the upper surface of the bearing cap C. On the other hand, the above-mentioned swing arm 53 is axially supported by the corresponding engaging member 52 at its upper end portion through the support shaft 54, and a support portion 53a for supporting the lower end of the central portion of the bearing cap C is formed at the lower end portion of the arm 53 to extend backward.

The above-mentioned opening/closing mechanism 55 comprises a link member 56 extending through the five gripping mechanisms 51 and coupled to substantially the middle portions of the swing arms 53 of the gripping mechanisms 51 via right-and-left pins 53b, an opening/closing cylinder 60 disposed at the rear end portion of the driven plate 47 through a bracket 57, and a coupling member 61 for coupling the rod of the cylinder 60 and the link member 56. When the rod of the cylinder 60 projects to drive the link member 56 forward, the swing arms 53 are pivoted (opened) forward, as indicated by alternate long and short dashed lines in FIG. 7, and do not interfere with the corresponding bearing caps C. When the rod of the cylinder 60 is retracted to move the link member 56 backward, the swing arms 53 are pivoted (closed) backward, and the support portions 53a are inserted below the corresponding bearing caps C, as indicated by solid lines in FIG. 7.

In this manner, while the swing arms 53 are opened and the driven plate 47 is located at its lower position, the bearing cap disassembling unit 14 is entirely moved downward. After the swing arms 53 are closed, the driven plate 47 is moved upward by the driving plate 42, so that the five bearing caps C are simultaneously removed from the cylinder block B. In this state, the bearing cap disassembling unit 14 is moved upward, and can be transferred to the lower metal assembling station S2.

(II) Upper Metal Holding Unit 15 (FIGS. 2, 3, and 8):

The upper metal holding unit 15 chucks five upper metals m2 prepared on the trays 22 of the metal feed station S3, and assembles them to the corresponding journal bearing portions J of the cylinder block B at the bearing cap disassembling station S1. As shown in FIG. 2, the upper metal holding unit 15 is attached to the movable base 11 to be separated from the central axis of the cap disassembling unit 14 to the right by a predetermined distance L.

Figure 8:
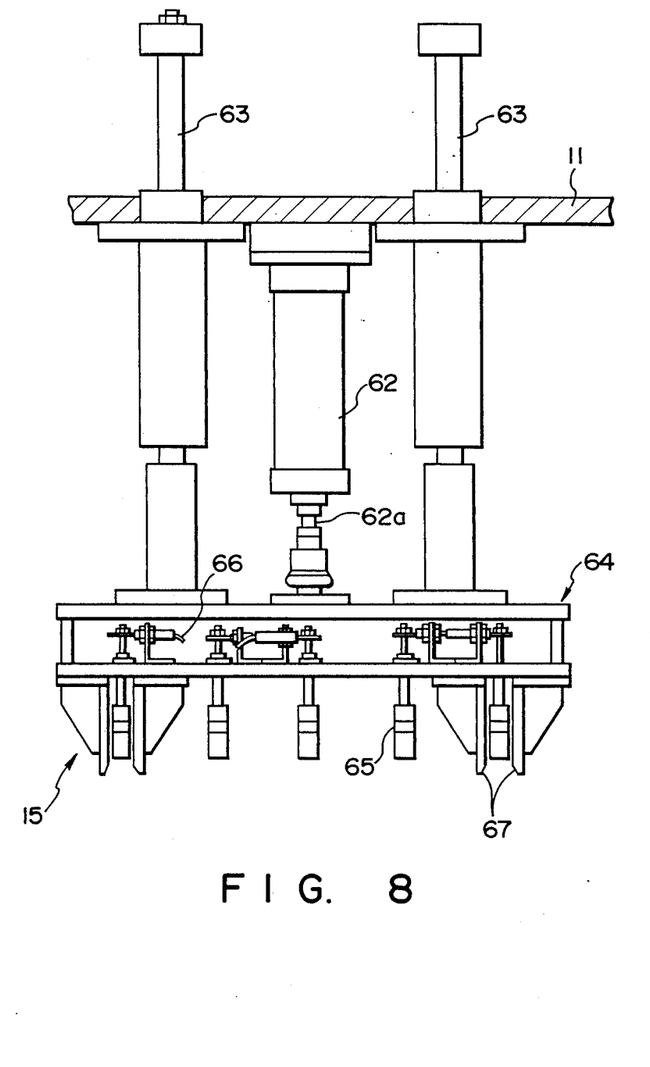
FIG. 8 is a side view showing an arrangement of the metal holding unit.

As shown in FIG. 8, the upper metal holding unit 15 comprises a pair of front and rear guide rods 63 which vertically extend at the right end portion of the movable base 11 at which the above-described bearing cap disassembling unit 14 is arranged. A holder frame 64 is vertically movably supported below the lower surface of the movable base 11 through these guide rods 63. The holder frame 64 extends in the back-and-forth direction. The holder frame 64 is connected to a piston rod 62a of a lift cylinder 62 fixed to the lower surface of the movable base 11. In this manner, the holder frame 64 is vertically moved upon driving of the lift cylinder 62.

Five semi-circular suction members 65 are aligned in line along the back-and-forth direction on the lower end of the holder frame 64. Each suction member 65 is connected to a negative pressure introduction hose 66. A negative pressure is introduced to the suction surface of each suction member 65 through the negative pressure introduction hose 66. On the basis of this negative pressure, each suction member 65 can chuck an upper metal m2. Guide members 67 which are engaged with the side wall portion of the cylinder block B to align the upper metals m2 are arranged in front of and behind each of the suction members 65 arranged at the front and rear ends, respectively. In this manner, the upper metals m2 are assembled to the journal bearing portions J of the cylinder block B from which the caps C are moved while being accurately aligned by the guide members 67.

Figure 9:
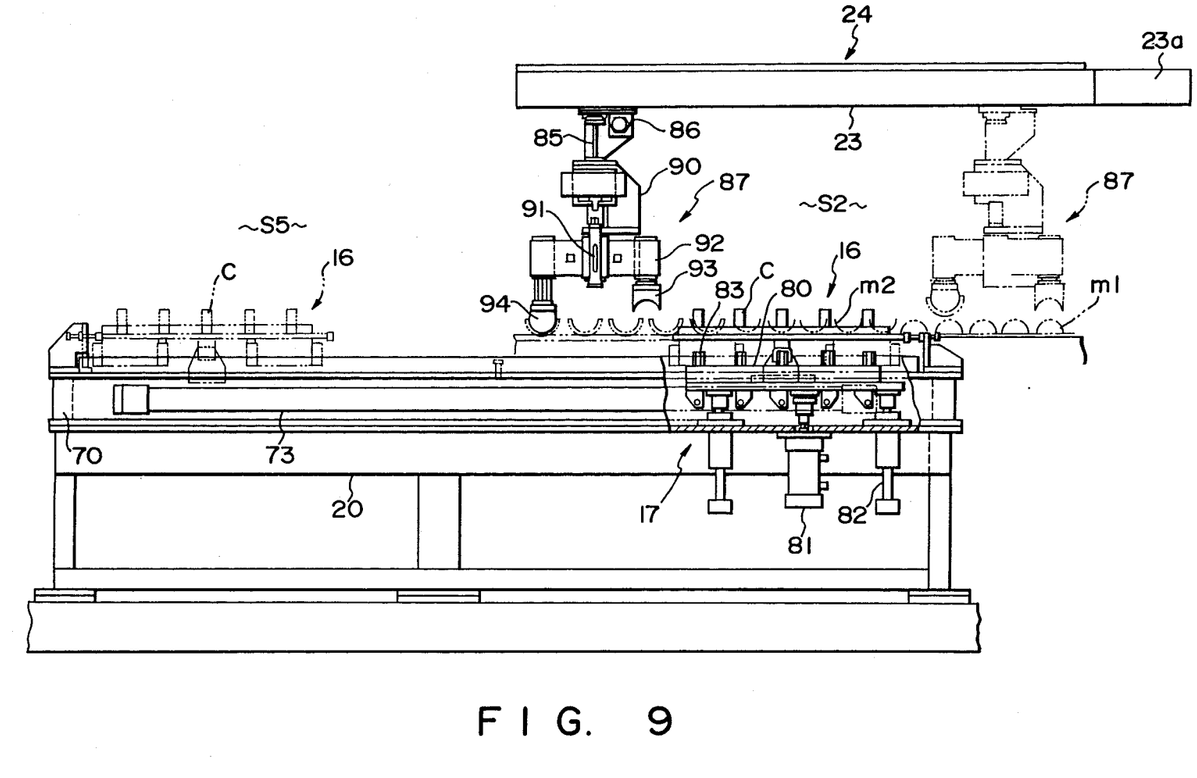
FIG. 9 is a side view showing arrangement of a bearing cap conveyor line, a lower metal assembling unit, and a metal feed unit.
Figure 10:
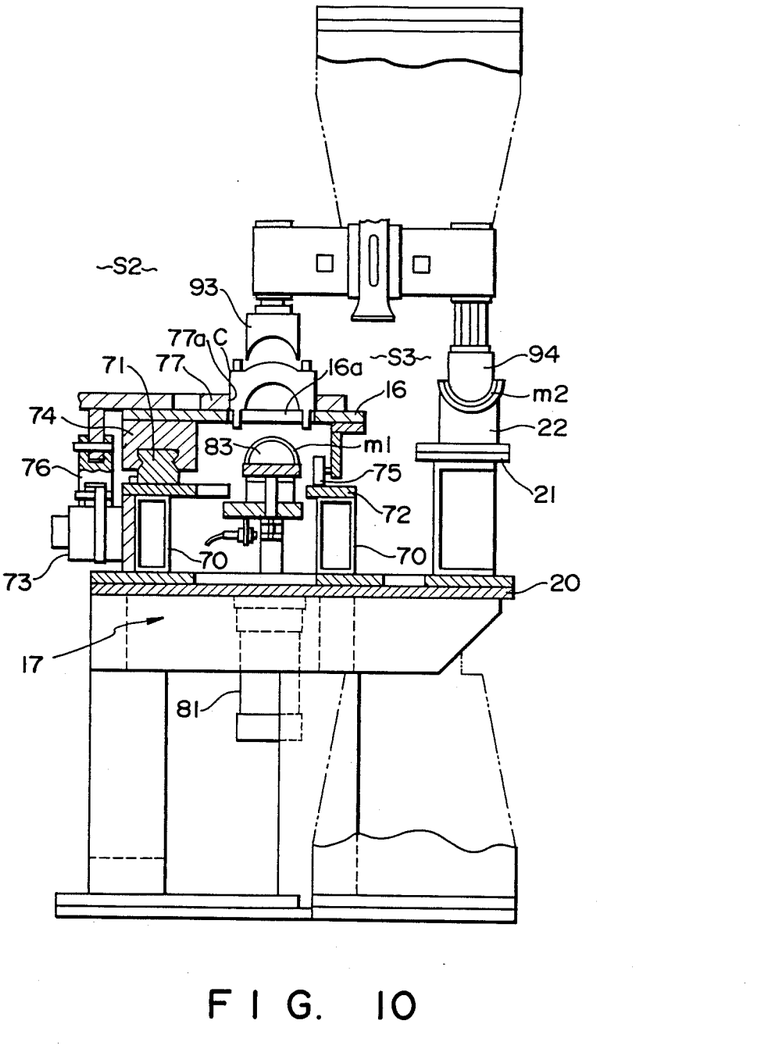
FIG. 10 is a front view showing an arrangement of the lower metal assembling unit.

(III) Lower Metal Assembling Unit 17 and Bearing Cap Conveyor Line (FIGS. 1, 2, 9, and 10):

As shown in FIGS. 1 and 9, the base frame 20 extends from the lower metal assembling station S2 to the shaft feed station S5. A pair of right and left strake members 70 defining a closed section are placed on the base frame 20, as shown in FIG. 10. In FIG. 10, a rail member 71 extending in the back-and-forth direction is mounted on the upper surface of the left strake member 70. A flat rail 72 is mounted on the upper surface of the right strake member 70 to be parallel to the rail member 71. A rodless cylinder 73 extends on the left side of and along the left strake member 70, as shown in FIG. 9.

A slide block 74 slidably engaged with the rail member 71 is attached to the lower left portion of the pallet 16. A driven wheel 75 is rotatably and axially supported on the lower right portion of the pallet 16. The driven wheel 75 is in rolling contact with the flat rail 72. The left end portion of the pallet 16 is coupled to the output portion of the rodless cylinder 73 through a coupling member 76, as shown in FIG. 10. With this arrangement, the pallet 16 can be reciprocally moved along the back-and-forth direction between the lower metal assembling station S2 and the shaft feed station S5.

The pallet 16 is provided with bearing cap placing portions capable of receiving the five bearing caps C removed from the cylinder block B. More specifically, each bearing cap placing portion comprises a regulating plate 77 having an opening 77a for regulating the position of each of the five bearing caps C while being overlaid on the upper surface of the pallet 16, as shown in FIG. 10. With this regulating plate 77, the five bearing caps C are held at the predetermined positions. Openings 16a for allowing two bolts and lower metals m1 to pass therethrough immediately below the bearing cap placing portions are formed in the pallet 16.

The lower metal assembling unit 17 is disposed in front of the base frame 20 and below the pallet 16, as shown in FIG. 9. An elongated holder member 80 extending below the five bearing cap placing members in the back-and-forth direction is vertically movably supported through a pair of front and rear guide rods 82. The holder member 80 is coupled to a piston rod of a lift cylinder 82, and is vertically moved upon driving of the lift cylinder 82.

Five suction heads 83 for chucking lower metals m1 are attached to the upper surface of the holder member 80. Each suction head 83 is connected to a negative pressure introduction hose (not shown). A negative pressure is introduced to the corresponding suction heads 83 through the negative pressure introduction hoses, and the suction heads 83 can hold the lower metals m1 based on the negative pressure.

After the five suction heads 83 hold the lower metals m1, the five bearing caps C are placed on the pallet 16, and the holder member 80 is then moved upward, so that the lower metals m1 are assembled to the corresponding bearing caps C via the suction heads 83.

Upon assembly of the lower metals m1, the bearing caps C are pressed upward by the engaging members 52 and their pressing members 52b of the bearing cap disassembling unit 14.

As shown in FIG. 2, the central line of each tray 22 on which the upper metal m2 is tentatively placed is set to be separated from the central line of the corresponding suction head 83 for chucking the lower metal m1 by the same distance as the distance L between the central axes of the upper metal holding unit 15 and the cap disassembling unit 14.

(IV) Metal Feed Unit 24 (FIGS. 1, 2, and 9):

In the girder 23 located at the right ends of the horizontal beams 10a of the portal frames 10, a carriage 84 which can travel in the girder 23 along the back-and-forth direction is disposed, as shown in FIG. 2. The carriage 84 is driven by a driving apparatus disposed in a front end portion 23a of the girder 23. An opening is formed in the bottom wall of the girder 23 to extend over its entire length. A movable beam 85 extending in the right-and-left direction is disposed on the lower portion of the girder 23. The movable beam 85 is coupled to and supported by the carriage 84 to be movable in the right-and-left direction. The movable beam 85 is moved along the back-and-forth direction upon travel of the carriage 84, and is moved by a moving cylinder 86 (FIG. 9) disposed on the movable beam 85 in the back-and-forth direction, as indicated by a solid line and an alternate long and two short dashed line in FIG. 2.

As shown in FIG. 9, a handling mechanism 87 for chucking a pair of upper and lower metals m2 and m1 from the downstream portion of the metal conveyor line 3 and feeding them to the tray 22 and the suction head 83, respectively, depends from the left end portion of the movable beam 85. The handling mechanism 87 comprises a support frame 90 attached to the lower surface of the movable beam 85. A pivot shaft 91 which is rotatable about a vertical axis is attached to the support frame 90. The pivot shaft 91 is rotated by a motor (not shown), and is vertically moved by a cylinder (not shown). A holder beam 92 is fixed to the lower end portion of the pivot shaft 91. A suction head 93 for chucking the lower metal and a suction head 94 for chucking the upper metal are juxtaposed on the two end portions of the holder beam 92. Although not shown, these suction heads 93 and 94 are connected to negative pressure introduction hoses.

As shown in FIG. 9, the suction heads 93 and 94 are set to be separated by the same distance as the distance L between the central line of the tray 22 on which the upper metal m2 is tentatively placed and the central line of the suction head 83 for chucking the lower metal m1. The upper and lower metals m2 and m1 are placed on the metal conveyor line 3 so that they are separated by the predetermined distance L.

The operations of the apparatus for disassembling bearing caps and assembling metals with the above arrangement will be described below.

In the metal feed unit 24, before the bearing caps C are placed on the pallet 16, the holder beam 92 is pivoted to extend in the back-and-forth direction, and the handling mechanism 87 simultaneously chucks a pair of upper and lower metals m2 and m1 on the metal conveyor line 3. The carriage 84 and the movable beam 85 are respectively moved, so that the handling mechanism 87 is moved above the lower metal assembling unit 17. Thereafter, the holder beam 92 is pivoted to extend in the back-and-forth direction, and the chucked upper and lower metals m2 and m1 are simultaneously fed to the tray 22 and the suction head 83 of the lower metal assembling unit 17. This operation is repeated, so that the five pairs of upper and lower metals m2 and m1 are fed to the lower metal assembling unit 17.

At the bearing cap disassembling station S1, the suction members 65 of the upper metal holding unit 15 moved to the upper position respectively hold the five upper metals m2 which were chucked in the immediately preceding cycle. In this state, the upper metal holding unit 15 and the bearing cap disassembling unit 14 stand by, as indicated by the solid lines in FIG. 1. In the standby state, a cylinder block B whose journal bearing portions have already been machined and to which bearing caps C have been tentatively assembled is conveyed to the bearing cap disassembling station S1.

When the cylinder block B is stopped at a predetermined position, the bearing cap removing mechanism 35 is operated to extend the rod of the opening/closing cylinder 60, thereby opening the swing arms 53, and to extend the rod 46a of the removing cylinder 46 to move the driven plate 47 downward. In this manner, the gripping mechanisms 51 are ready to grip the bearing caps C. Thereafter, a rod 27a of the lift cylinder 27 is extended to move the entire bearing cap disassembling unit 14 downward, so that the output heads 34 of the nut runners 33 are engaged with bolts for fastening the corresponding bearing caps. The 10 nut runners 33 are driven to pivot the bolts for fastening the ten bearing caps to completely loosen them. In this manner, the bearing caps C are ready to be removed from the cylinder block B.

The rod of the opening/closing cylinder 60 is retracted to close the swing arms 53 to reliably grip the bearing caps C by the gripping mechanisms 51. The rod 46a of the removing cylinder 46 is retracted to move the driving plate 42 forward. As a result, the five bearing caps C are moved upward by a predetermined height, and hence, are removed from the cylinder block B. Thereafter, the rod 27a of the lift cylinder 27 is retracted upward, so that the bearing cap disassembling unit 14 which grips the five bearing caps C is moved upward.

Thereafter, the cylinders 12 and 13 are started to move the movable base 11 to the left by a predetermined distance. The bearing cap disassembling unit 14 and the upper metal holding unit 15 are attached to the movable base 11. As a result, upon left movement of the movable base 11, the upper metal holding unit 15 is moved above the cylinder block B from which the bearing caps C are disassembled. The rod of the cylinder 62 is then pushed downward to move the holder frame 64 downward, so that the five upper metals m2 are simultaneously assembled to the five journal bearing portions J of the cylinder block B by the metal holding unit 15.

After the holder frame 64 is moved upward, the cylinders 12 and 13 are started in the reverse direction to move the movable base 11 to the right in FIG. 1 by a predetermined distance. While the bearing cap disassembling unit 14 is located at a predetermined position above the pallet 16, and hence, the upper metal holding unit 15 is moved to a predetermined position above the trays 22, the bearing cap disassembling unit 14 is moved downward to a predetermined level through the lift cylinder 27. Thereafter, the five bearing caps C are respectively placed on the bearing cap placing portions of the pallet 16. The driving plate 42 is moved backward through the removing cylinder 46 to open the swing arms 53. In this manner, the bearing caps C disassembled from the cylinder block B are placed on the bearing cap placing portions.

Parallel to this placing operation, the upper metal holding unit 15 moves the holder frame 64 downward until its suction members 65 abut against the upper metals m2 on the trays 22. In this manner, the upper metals m2 are chucked by the corresponding suction members 65.

After the above-mentioned placing operation, while the upper ends of the bearing caps C are pressed by the pressing members 52b of the engaging members 52, the lower metal assembling unit 17 is operated to move the holder member 80 upward. In this manner, the lower metals m1 chucked by the suction heads 83 are assembled to the corresponding bearing caps C.

After the assembly of the lower metals m1, the rods of the cylinders 27 and 62 are retracted to move the bearing cap disassembling unit 14 and the upper metal holding unit 15 upward to a predetermined level. Thereafter, the cylinders 12 and 13 are started again to move the movable base 11 to the left, i.e., to a state shown in FIG. 1. In this manner, a cycle of the disassembling operation of the bearing caps C from the cylinder block B and the metal assembling operation is completed.

Thereafter, the pallet 16 placing the five bearing caps C with the lower metals m1 is transferred to the shaft feed station S5. The cylinder block B from which the bearing caps C are disassembled and to which the upper metals m2 are assembled is transferred to the shaft assembling station S4. After the crankshaft is assembled to the cylinder block B, the five bearing caps C are assembled to the cylinder block B. In this manner, the crankshaft is assembled to the cylinder block B to be pivotally and axially supported through the metals.

As described above, according to this embodiment, the bearing cap disassembling unit 14 and the upper metal holding unit 15 are juxtaposed on the common movable base 11, and the movable base 11 is reciprocated between the lower metal assembling station S2 and the metal feed stations S3 arranged beside the base 11, so that disassembly of the bearing caps C from the cylinder block B and assembly of the upper and lower metals m2 and m1 are performed during one reciprocal movement of the movable base 11. As a result, the movable base 11 can be efficiently moved, and the number of steps is decreased, so that the cycle time can be minimized. In this manner, the positional relationship between the bearing cap disassembling unit 14 and the upper metal holding unit 15 is set to correspond to the positional relationship between the lower metal assembling unit 17 and the trays 22, thus decreasing the number of steps.

The present invention is not limited to the arrangement of the above embodiment, and various changes and modifications may be made within the spirit and scope of the invention.

In the above embodiment, the bearing cap disassembling unit 14 is located on the left side of the movable base 11, and the upper metal holding unit 15 is located at its right side. However, the present invention is not limited to this arrangement. For example, the upper metal holding unit 15 may be located on the left side of the movable base 11, and the bearing cap disassembling unit 14 may be located on its right side. In this case, the arrangements of the trays 22 and the lower metal assembling unit 17 on the base frame 20 are reversed, so that the trays 22 are located at the left side on the base frame 20, and the lower metal assembling unit 17 is located on the right side.

In the above embodiment, the lower metal assembling unit 17 for assembling the lower metals m1 to the bearing caps C and the trays 22 for receiving the upper metals m2 are juxtaposed to be separated at the same distance as the distance between the bearing cap disassembling unit 14 and the upper metal holding unit 15 on the base frame 20 arranged on the right side of the bearing cap disassembling station S1. However, the present invention is not limited to this arrangement. For example, the lower metal assembling unit 17 may be disposed at the left side of the bearing cap disassembling station S1, and the trays 22 may be disposed at its right side. With this arrangement, the movement of the movable base 11 can be further simplified.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for disassembling bearing caps from a cylinder block and assembling upper metals to the cylinder block and lower metals to the bearing caps, which apparatus comprising:

a conveyor line on which a cylinder block to which the bearing caps are tentatively assembled is conveyed in an up-side down state;

a disassembling/assembling station, arranged on said conveyor line, for disassembling the bearing caps from the cylinder block and assembling the upper metals to the cylinder block;

a lower metal assembling station having lower metal assembling means, arranged beside said disassembling/assembling station, for assembling the lower metals to the bearing caps disassembled at said disassembling/assembling station;

a metal feed station for feeding the upper and lower metals;

a movable base which is reciprocally moved between a position above said lower metal assembling station and a position above said conveyor line;

bearing cap disassembling means and upper metal holding means, commonly attached to said movable base, said bearing cap disassembling means disassembling the bearing caps tentatively assembled to the cylinder block and said upper metal holding means holding and assembling a plurality of upper metals to the cylinder block; and moving means, connected to said movable base, for moving said movable base so that a disassembling operation of the bearing caps from the cylinder block, an assembling operation of the upper metals to the cylinder block, and an assembling operation of the lower metals to the bearing caps are performed within one reciprocal movement of said movable base.

2. The apparatus according to claim 1, wherein said metal feed station includes metal feed means, arranged beside said lower metal assembling station, for feeding the lower metals to said lower metal assembling means and feeding the upper metals to said upper metal holding means.

3. The apparatus according to claim 2, wherein said metal feed means includes trays on which the upper metals to be held by said upper metal holding means are temporarily placed.

4. The apparatus according to claim 3, wherein said bearing cap disassembling means and said upper metal holding means are separated by the same distance as a distance between said trays and said lower metal assembling means.

5. The apparatus according to claim 4, wherein said upper metal holding means is arranged at a side where said lower metal assembling station is disposed with respect to said bearing cap disassembling means, and said trays are arranged at the same side as the side where said upper metal holding means is arranged with respect to said lower metal assembling station.

6. The apparatus according to claim 5, wherein said moving means moves said movable base in the following order of:

(a) moving said bearing cap disassembling means to a position above the cylinder block conveyed to said disassembling/assembling station, where said bearing cap disassembling means disassembles the bearing caps from the cylinder block and holds the disassembled bearing caps;

(b) moving said upper metal holding means to a position above the cylinder block from which the bearing caps are disassembled, where said upper metal holding means assembles the upper metals to journal portions of the cylinder block; and (c) moving said bearing cap disassembling means holding the bearing caps disassembled from the cylinder block to a position above said lower metal assembling station and moving said upper metal holding means to a position above said trays, so that the lower metals are assembled to the bearing caps at said lower metal assembling station, and said upper metal holding means holds the upper metals temporarily placed on said trays.

7. The apparatus according to claim 3, which further comprises:
a base frame for commonly supporting said lower metal assembling means and said trays.

8. The apparatus according to claim 7, wherein said lower metal assembling means includes:
a cap convey pallet which is moved along said base frame to be parallel to said conveyor line, and on which the bearing caps disassembled from the cylinder block are placed; and
convey means for conveying said cap convey pallet to the next step after the lower metals are assembled to the bearing caps placed on said cap convey pallet.

9. The apparatus according to claim 8, wherein said metal feed means feeds the lower metals to said lower metal assembling means before the bearing caps are placed on said cap convey pallet.

10. The apparatus according to claim 8, wherein said metal feed means feeds the lower metals to said lower metal assembling means and at the same time, temporarily places the upper metals on said trays.

11. The apparatus according to claim 1, wherein said bearing cap disassembling means includes:
a support frame vertically movably attached to said movable base; and
nut runners, mounted on said support frame, for turning bolts fixing the bearing caps to the cylinder block to release a fixed state between the cylinder block and the bearing caps.

12. The apparatus according to claim 11, wherein said bearing cap disassembling means includes bearing cap removing means, mounted on said support frame, for removing the bearing caps whose fixed state to the cylinder block is released by said nut runners from the cylinder block.

13. The apparatus according to claim 12, wherein said bearing cap removing means includes:
a driven member vertically movably attached to said support frame;
vertical driving means for vertically moving said driven member;
gripping means, attached to said driven member, for gripping each bearing cap in the vertical direction; and
opening/closing means for opening/closing said gripping means.

14. The apparatus according to claim 13, wherein said gripping means includes:
engaging members each of which is fixed to a lower surface of said driven member, and is engaged with an upper surface of each bearing cap; and
swing arms each of which is rotatably and axially supported by each of said engaging members, is pivoted in a closing direction to support a lower surface of the corresponding bearing cap from below, and is pivoted in an opening direction to be escaped from a position below the corresponding bearing cap.

15. The apparatus according to claim 14, wherein said opening/closing means includes:
a link member which is movable in a horizontal direction and is engaged with all of said swing arms through pins; and
horizontal driving means, coupled to said link member, for moving said link member in one direction along the horizontal direction to simultaneously pivot said swing arms in the opening direction, and moving said link member in the other direction to simultaneously pivot said swing arms in the closing direction.

16. The apparatus according to claim 14, wherein each of said engaging members includes:
a pressing member which is vertically movably arranged and is brought into contact with the upper surface of the corresponding bearing cap; and
a biasing member for biasing said pressing member downward.

17. The apparatus according to claim 13, wherein said vertical driving means includes:
member disposed below said driven member to be movable in the horizontal direction;
a first cam member fixed to the lower surface of said driven member and having a surface inclined along a moving direction of said driving member;
a second cam member fixed to the upper surface of said driving member having a surface which is in sliding contact with the inclined surface of said first cam member; and
a driving cylinder, connected to said driving member, for reciprocally moving said driving member in the horizontal direction.

18. The apparatus according to claim 17, wherein said bearing cap removing means includes a base member attached below said support frame to be separated by a predetermined distance through a plurality of guide columns, and
said driven member is guided to be movable in the vertical direction while said guide columns are inserted therethrough.

19. The apparatus according to claim 18, wherein said driving member is disposed to be slidable on a base member.

20. The apparatus according to claim 19, wherein said driving cylinder is attached to said base member.

* * * * *